J. D. KRENZ.
FLY NET HOLDER.
APPLICATION FILED JULY 13, 1910.
989,369.
Patented Apr. 11, 1911.
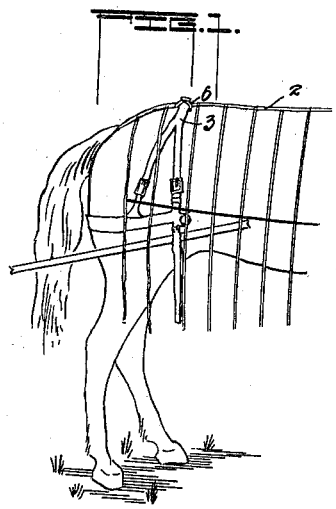
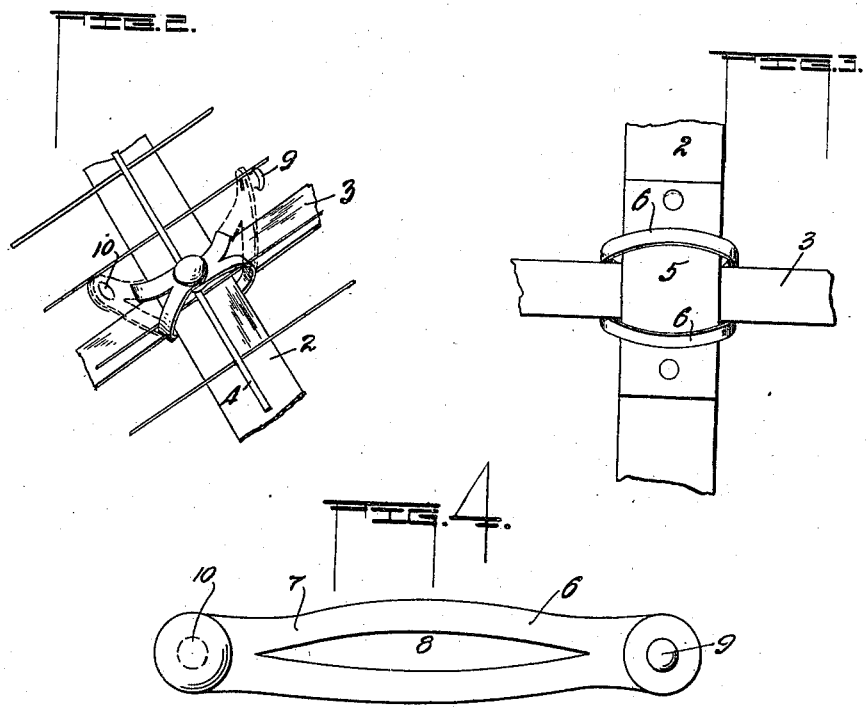
WITNESSES
INVENTOR
Julius D. Krenz
BY
ATTY

UNITED STATES PATENT OFFICE.

JULIUS D. KRENZ, OF PEORIA, ILLINOIS.

FLY-NET HOLDER.

989,369.  Specification of Letters Patent.  Patented Apr. 11, 1911.

Application filed July 13, 1910. Serial No. 571,723.

*To all whom it may concern:*

Be it known that I, JULIUS D. KRENZ, a citizen of the United States, residing at Peoria, in the county of Peoria and State of Illinois, have invented certain new and useful Improvements in Fly-Net Holders, of which the following is a specification.

My invention relates to fly net holders.

The object of my invention is to provide a simple, inexpensive and effective device for the purpose that will be detachable, yet when attached to the harness will remain permanently in place while in use to secure the fly net and will present the least possible obstruction to harness parts or other things likely to be caught thereon and will present a neat appearance.

Referring to the drawings: Figure 1 is a view showing a portion of a horse with attached harness and fly net. Fig. 2 is a perspective view showing the application of my invention. Fig. 3 is a bottom view showing the lower face of the back strap with my device attached. Fig. 4 is a plan view of my device.

The invention consists in slitting a narrow band adapted to be looped about the back-strap of a harness so that the hip-strap will lie within the slit opening to provide against slipping of the loop strap out of its proper place, and providing the ends of the loop strap with interengaging members to secure them together in a detachable relation.

In the drawing, 2 is the back-strap; 3, is a hip-strap; 4, is a longitudinal strand of a fly net; 5 is a loop-strip attached to the back-strap between which loop-strip and back-strap the hip-strap is passed in assembling the harness.

The fly net holder, which as a whole is designated as 6, consists of a loop strap 7, made of leather or other suitable material of a flexible nature and slitted longitudinally as at 8; 9 is an expansion stud and 10, is a metal socket; the parts 9 and 10, adapted to interengage to unite the ends of the loop-strap. I have shown and described a particular means for securing the ends of the loop-strap together, but obviously any other form of clasp or means of uniting the ends may be employed without departing from the spirit of my invention.

In applying the fastener, it is passed underneath the back-strap, then the hip-strap is passed through the loop in the back-strap and will lie within the slit in the loop-strap. In this position it will be seen that the loop-strap is held from movement lengthwise of the back-strap or sidewise thereof. The device in the position described, which is that shown particularly in dotted lines in Fig. 2, that is, the loop-strap being open—the middle longitudinal strand of the fly-net is laid over the back-strap between the ends of the loop-strap—as shown in Fig. 2—then the ends of this strap are snapped together as shown in solid lines in the same figure, thus securing the fly-net and holding it in place.

The fly-net may be released by simply snapping the clasp of the loop-strap and removed from the horse, but the loop-strap being thus fastened to the harness remains in place and in proper position to again be used to fasten the fly net.

What I claim:

1. The combination with the back-strap and the hip-strap of a harness of a longitudinally slitted loop-strap, adapted to be passed around the back-strap and the slit therein to embrace the hip-strap, and provided with engaging means on the respective ends thereof, the loop-strap adapted to engage a part of the fly net in a detachable relation to hold the same in place.

2. The combination with the back-strap and hip-strap of a harness, of a slitted loop-strap passed around the back-strap and the slit therein embracing the hip-strap and provided with interclasping means on its respective ends, whereby, when properly attached to a harness, it is adapted to detachably engage a portion of the fly net to hold it in proper position on the horse.

In testimony whereof I affix my signature in presence of two witnesses.

JULIUS D. KRENZ.

Witnesses:
 FLORIDA E. GRABLE,
 W. V. TEFFT.

Copies of this patent may be obtained for five cents each, by addressing the "Commissioner of Patents, Washington, D. C."